(12) United States Patent
Bertolini et al.

(10) Patent No.: US 12,470,142 B2
(45) Date of Patent: Nov. 11, 2025

(54) DC-DC CONVERTER APPARATUS AND CORRESPONDING CONTROL METHOD

(71) Applicant: STMicroelectronics S.r.l., Agrate Brianza (IT)

(72) Inventors: Alessandro Bertolini, Vermiglio (IT); Alessandro Gasparini, Cusano Milanino (IT); Paolo Melillo, Caltanissetta (IT); Salvatore Levantino, Milan (IT); Massimo Ghioni, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 180 days.

(21) Appl. No.: 18/376,277

(22) Filed: Oct. 3, 2023

(65) Prior Publication Data

US 2024/0128871 A1 Apr. 18, 2024

(30) Foreign Application Priority Data

Oct. 6, 2022 (IT) .................. 102022000020607

(51) Int. Cl.
*H02M 3/158* (2006.01)
*H02M 3/157* (2006.01)

(52) U.S. Cl.
CPC .......... *H02M 3/158* (2013.01); *H02M 3/157* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18;
(Continued)

(56) References Cited

U.S. PATENT DOCUMENTS 9,240,721 B2 * 1/2016 Babazadeh ......... H02M 3/1584
10,404,165 B2 * 9/2019 Mao .................. H02M 3/156
(Continued)

FOREIGN PATENT DOCUMENTS

CN 114400892 A 4/2022

OTHER PUBLICATIONS

Melillo, Paolo, et al.: "A Novel Feedforward Technique for Improved Line Transient in Time-Based-Controlled Boost Converters," Prime 2022, Villasimius, Italy, Power Electronics, 4 pgs.
(Continued)

*Primary Examiner* — Jeffrey A Gblende
(74) *Attorney, Agent, or Firm* — Crowe & Dunlevy LLC

(57) ABSTRACT

A boost DC-DC converter includes a switching network, coupled to an inductor, controlled by a PWM driving signal. A control loop receives a voltage output and provides the PWM driving signal. The control loop generates an error signal as a function of a difference between voltage output voltage and a reference, with the PWM driving signal generated based on the error signal. A low pass filter circuit within the control loop receives the PWM driving signal and provides at least one filtered signal. An adder node of the control loop receives the at least one filtered signal from the low pass filter circuit for addition to the at least one filtered signal. The PWM driving signal is generated as a function of a sum of the filtered signal and the error signal.

16 Claims, 10 Drawing Sheets

(58) Field of Classification Search
CPC ... G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069

See application file for complete search history.

(56) References Cited

U.S. PATENT DOCUMENTS

| | | | |
|---|---|---|---|
| 11,223,237 B2* | 1/2022 | Li | H02M 3/07 |
| 12,074,520 B2* | 8/2024 | Liang | H02M 3/157 |
| 2008/0164859 A1* | 7/2008 | Peng | H02M 3/157 |
| | | | 323/318 |
| 2022/0216789 A1 | 7/2022 | Gasparini et al. | |

OTHER PUBLICATIONS

IT Search Report and Written Opinion for priority application, IT Appl. No. 102022000020607, report dated May 3, 2023, 7 pgs.

* cited by examiner

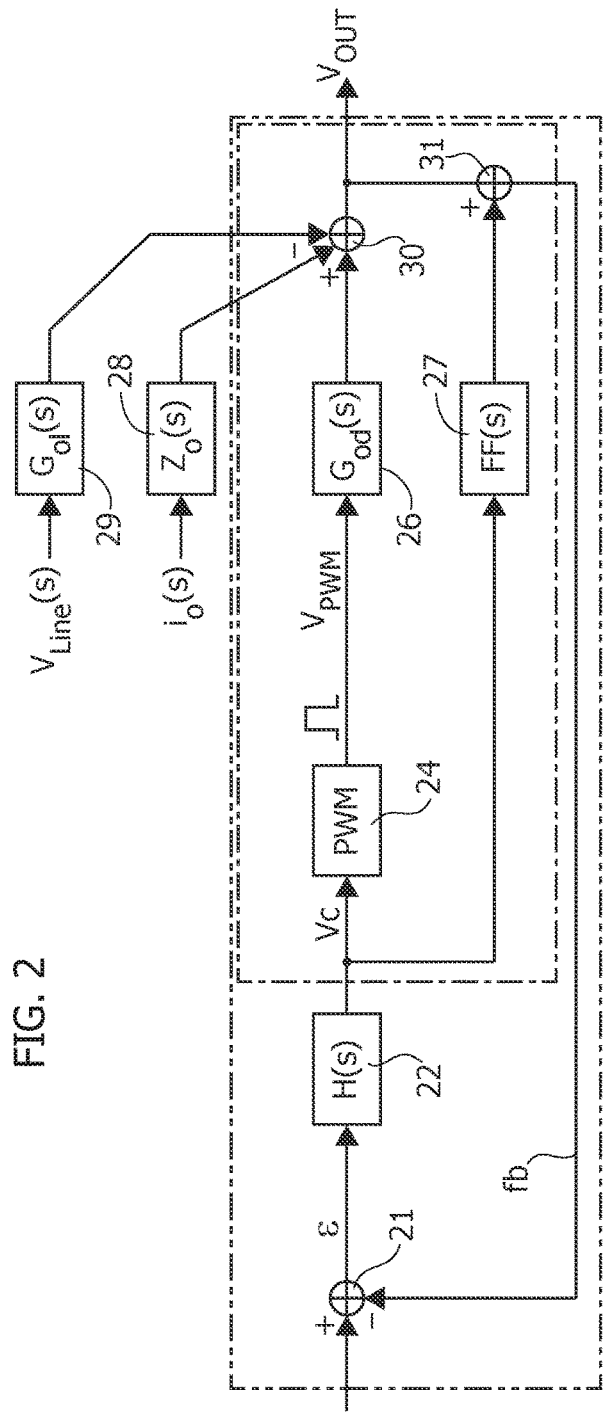
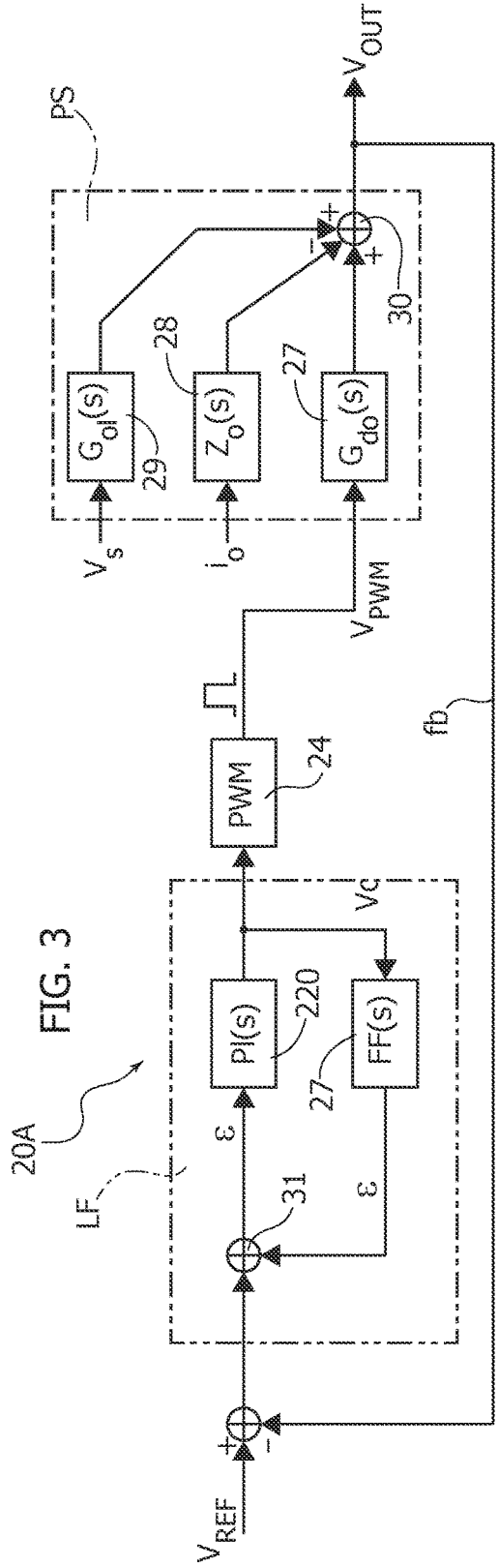

DC-DC CONVERTER APPARATUS AND CORRESPONDING CONTROL METHOD

PRIORITY CLAIM

This application claims the priority benefit of Italian Application for Patent No. 102022000020607, filed on Oct. 6, 2022, the content of which is hereby incorporated by reference in its entirety to the maximum extent allowable by law.

TECHNICAL FIELD

The description relates to power management integrated circuits (PMICs), such as a DC-DC converter apparatus comprising a time-based control loop, for instance.

One or more embodiments may be applied to, e.g., organic light-emitting diode (OLED), display panels.

BACKGROUND

Switching DC-DC converters are used in a variety of electronic systems. For instance, DC-DC converters can be used to provide a supply voltage level to an AMOLED display unit converting a battery-fed voltage level to a regulated (positive) output voltage level.

Various types of electronic converters are conventionally used, such as "buck" or "boost" converters, for instance. These types of converters are well known to the person skilled in the art, as evidenced, e.g., by the application note AN513/0393 "Topologies for Switched Mode Power Supplies", L. Wuidart, 1999, STMicroelectronics (incorporated herein by reference).

DC-DC converters, such as boost-type converters, can be used in a variety of applications.

A conventional implementation of a converter circuit (currently referred to as "time-based") comprises: a (voltage or current) controlled oscillator to perform integration in the phase domain; and delay lines providing a proportional/derivative action.

Depending on the application, in order to provide adequate efficiency and performance levels, a time-based DC-DC converter circuit should desirably work in different modes (e.g., Continuous-Conduction Mode (CCM), Discontinuous-Conduction Mode (DCM), asynchronous mode, synchronous mode, etc.) and be able to operate reliably in different scenarios.

In DC-DC converters using a switching pair or network of transistors driven by a Pulse Width Modulated (PWM) signal, time-based approaches use the occurrences of rising edges of binary signals as variables inside the control loop. The advantage of this approach, compared to the voltage-based one, is a lower area occupation and lower power consumption. The performance gap between the two approaches further increases as the reference frequency of the converter increases.

The time-based approach takes advantage of the natural technology shrinking of the CMOS process using digital signals instead of analog ones inside the control loop. Moreover, the fully integrated DC-DC converter exploit lower filter inductance and capacitance values.

In order to maintain the same output voltage ripples, the reference frequency of the converter must increase to tens of MHz. While this change does not introduce any issues in the time-based control loop sizing, it directly impacts the voltage-based one with an increase of the error-amplifier (EA) bandwidth (leading to increased power consumption). The validity of such approach has already been tested, for instance, in the frame of High-Frequency CMOS Buck-Converter.

Ideally, the time-based architecture can be used also in the control loop of the boost converter achieving the same advantages. However, due to its non-minimum phase nature, the maximum achievable bandwidth of the boost converter is often limited by the presence of a right-half-plane (RHP) zero at $1/\tau_z$ that is inherently present in the control to output transfer function.

A (transfer) function $T_{control-to-out}(s)$ representing a control loop for a boost converter can be written as:

$$T_{control-to-out}(s) = G_{do}(s) = \frac{V_{in}}{(1-D)^2} \frac{(1+s\tau_{LHPz})(1-s\tau_{RHPz})}{\left(\frac{s^2}{\omega_0^2} + \frac{s}{Q\omega_0} + 1\right)} \quad (1)$$

Where: $\tau_{LHPz}$ is the left half plane zero, corresponding to a zero of a parasitic element of a capacitive element; $\tau_{RHPz}$ is the right-half-plane zero; $V_{in}$ indicates the input voltage signal; D indicates the duty-cycle; Q indicates the filter quality factor; and $$\omega_0 \simeq \frac{1-D}{\sqrt{LC_0}}$$

is the filter natural frequency.

The term $\tau_{RHPz}$ at the numerator is a right-half-plane (RHP) zero $1/\tau_z$ whose value depends on the inductance L, load $R_{load}$ and duty cycle D of the converter, as indicated herebelow:

$$\tau_z = \frac{L}{(1-D)^2 R_{load}} \quad (2)$$

The equation (2) also indicates that the value of the time constant $\tau_z$ of such a zero is larger as the load of the converter increases. Such an additional term is present solely when the converter works in PWM mode.

The maximum bandwidth of the system satisfies two inequalities, which may be expressed as:

$$BW_{max} \ll \frac{1}{2\pi\tau_z} \quad (3a)$$

$$BW_{max} \ll f_{sw} \quad (3b)$$

where $BW_{max}$ indicates a maximum achievable bandwidth, and $f_{sw}$ indicates a PWM switching frequency. In an LED display application, the current capability required is such that the first term is always limiting with respect to the second one. Considering a standard PID compensation network, with transfer function:

$$T_{PID}(s) = \frac{K_{PID}(1+s\tau_{z1})(1+s\tau_{zh})}{s(1+s\tau_{p1})(1+s\tau_{p2})}, \quad (4)$$

where $\tau_{z1}$ and $\tau_{zh}$ indicate time constants of two zeroes, $\tau_{p1}$ and $\tau_{p2}$ indicate time constants of the high frequency poles and $K_{PID}$ indicates a PID DC gain. In order to fulfill the requirement in equation (3a), the design of the PID network would involve high values of the time constants $\tau_{zh}$ and $\tau_{zl}$ of the zeroes.

In order to exploit the full advantages of the time-based implementation, overcoming the bandwidth limitation introduced by the RHP zero in equation (3a) has some relevance.

The right-half-plane (RHP) zero present in the transfer function of an open-loop control-to-output of (e.g., non-minimum phase) DC-DC converters leads to limiting the bandwidth of such devices.

For instance, in the known non-minimum phase converters, the bandwidth of the control system is kept below the RHP zero in order to keep the loop stable for every working condition.

A list of documents discussing existing approaches comprises, for instance:

(1) SW Lee, "Practical feedback loop analysis for voltage-mode boost converter". In: Application Report (2014) discusses a type III compensator to design the loop for a voltage-mode boost converter operating in continuous conduction mode (CCM), where right-half-plane (RHP) zero has additional constraints on the design of loop compensation and crossover frequency;

(2) K. Viswanathan, R. Oruganti and D. Srinivasan, "A novel tri-state boost converter with fast dynamics," in IEEE Transactions on Power Electronics, vol. 17, no. 5, pp. 677-683, September 2002 discusses design of boost converters operating in continuous-conduction mode whose problem is posed by the dynamically shifting right-half-plane (RHP) zero in the converter's small-signal control-to-output transfer function;

(3) Y. Gu, D. Zhang and Z. Zhao, "Input/Output Current Ripple Cancellation and RHP Zero Elimination in a Boost Converter using an Integrated Magnetic Technique", in IEEE Transactions on Power Electronics, vol. 30, no. 2, pp. 747-756, February 2015 discusses a digital current mode control (CMC) tuning method in a NIBB converter for fast voltage transitions from buck-mode to the boost-mode and back in dynamic voltage scaling (DVS), LED driving, and envelope tracking;

(4) S.-U. Shin et al., "A 95.2% efficiency dual-path DC-DC step-up converter with continuous output current delivery and low voltage ripple", 2018 IEEE International Solid-State Circuits Conference—(ISSCC), 2018, pp. 430-432.

(5) V. V. Paduvalli, R. J. Taylor, L. R. Hunt and P. T. Balsara, "Mitigation of Positive Zero Effect on Nonminimum Phase Boost DC-DC Converters in CCM," in IEEE Transactions on Industrial Electronics, vol. 65, no. 5, pp. 4125-4134, May 2018 discusses control loop stability in boost converters operating in continuous conduction mode and a method to mitigate the effect of the zero on the control loop by shifting the position of the zero to the left-half plane and hence leading to increased stability for the control loop of the boost converter; and (6) M. Leoncini, A. Bertolini, A. Gasparini, S. Levantino and M. Ghioni, "An 800-mA Time-Based Boost Converter in 0.18 μm BCD with RightHalf-Plane Zero Elimination and 96% Power Efficiency", ESSCIRC 2021—IEEE 47th European Solid State Circuits Conference (ESSCIRC), 2021, pp. 223-226 discusses a novel boost converter with time-based control for LED display applications, where using the inductor current, the right-half-plane zero of the CCM control-to-output transfer function is eliminated to improve dynamic performances with no extra off-chip component or power switch.

Each of the foregoing documents is incorporated herein by reference.

Existing approaches suffer from one or more of the following drawbacks: increased area footprint due to dedicated pads and external components, and higher power consumption due to the presence of extra components (load sensor, inductor current sensor).

There is accordingly a need in the art to contribute in advancing one or more aspects.

SUMMARY

One or more embodiments comprise a converter apparatus.

A boost DC-DC converter apparatus may be exemplary of such a converter apparatus.

One or more embodiments facilitate extending the loop bandwidth, e.g., improving the speed of the control system.

For instance, the controller can be reduced to a relatively simple proportional-integral (briefly, PI) controller.

For instance, the possibility to dispense from using additional sensors facilitates reducing system complexity.

In one or more embodiments, the reduction of system complexity facilitates reducing the area footprint and the power/current consumption, leading to a better overall system efficiency.

BRIEF DESCRIPTION OF THE DRAWINGS

One or more embodiments will now be described, by way of non-limiting example only, with reference to the annexed Figures, wherein:

FIGS. 2 and 3 is a diagram exemplary of principles underlying one or more embodiments.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc.

In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

Corresponding numerals and symbols in the different figures generally refer to corresponding parts unless otherwise indicated.

The figures are drawn to clearly illustrate the relevant aspects of the embodiments and are not necessarily drawn to scale.

The edges of features drawn in the figures do not necessarily indicate the termination of the extent of the feature.

Figure 1:
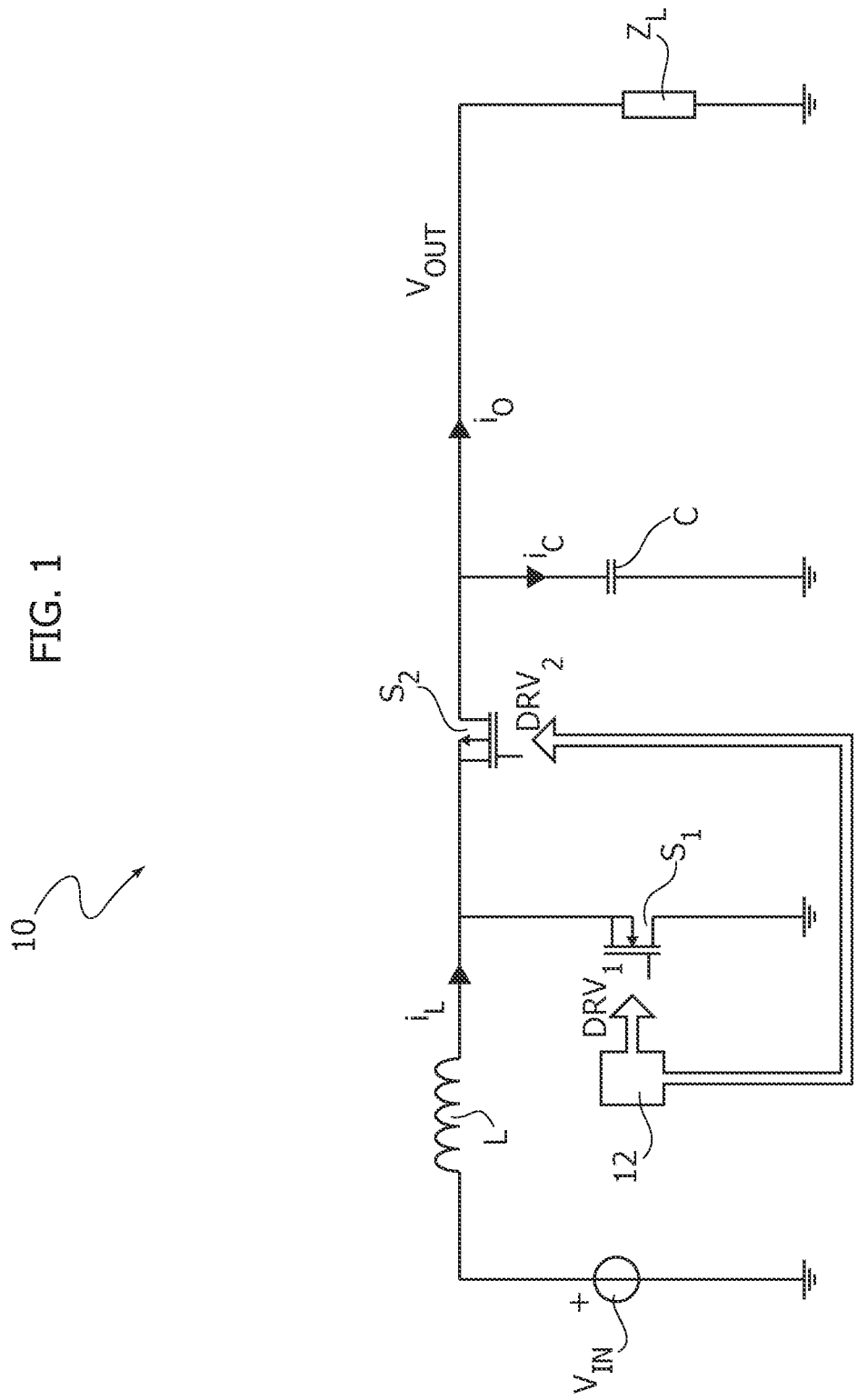
FIG. 1 is a diagram exemplary of a boost DC-DC converter.

As exemplified in FIG. 1, a boost converter 10 comprises: a supply node $V_{IN}$ configured to be coupled to a power supply source $V_{IN}$ to receive a supply voltage $V_{IN}$ therefrom. A half-bridge arrangement of switching transistors $S_1$, $S_2$ comprises a first switch $S_1$ and a second switch $S_2$ having a common switching node SW intermediate therebetween, the first switch $S_1$ comprising a first control node configured to receive a first control signal $DRV_1$ and having a current flow path therethrough between the switching node SW and ground GND, the second switch $S_2$ comprising a second control node configured to receive a second control signal $DRV_2$ and having a current flow path therethrough between the switching node SW and an output node $V_{OUT}$. The current flow path through the first switch $S_1$ and the second switch $S_2$ is configured to be made conductive in response to the respective first/second control signal $DRV_1$, $DRV_2$ having a first value and made non-conductive in response to the respective first/second control signal $DRV_1$, $DRV_2$ having a second value. An inductive circuit element L (e.g., an inductor coil) is coupled to the supply node $V_{IN}$ and to the switching node SW of the half-bridge arrangement $S_1$, $S_2$. A capacitive element C (e.g., a capacitor with a respective capacitance C) referred to ground GND is coupled to the output node $V_{OUT}$. The output node $V_{OUT}$ is configured to be coupled to an electric load $Z_L$ (e.g., a resistor). A controller 12 is configured to provide control signals $DRV_1$, $DRV_2$ to the first $S_1$ and second $S_2$ switches of the converter circuit 10.

Figure 1A:
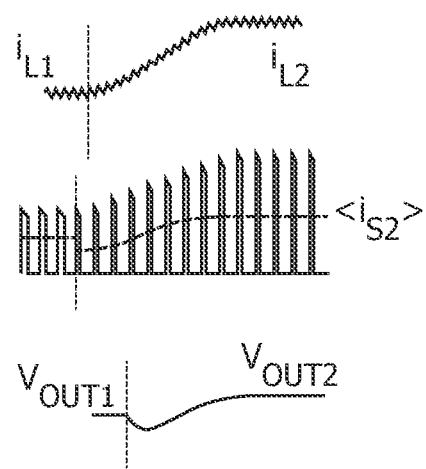
FIG. 1A is a diagram exemplary of a time evolution of signals in the converter exemplified in FIG. 1.

As exemplified in FIG. 1A, in the continuous conduction mode (CCM) of operation: an inductor current $i_L$ flows in the first switch $S_1$ during an "ON" time interval $T_{ON}$ in which the current flow path through the first switch $S_1$ is made conductive (that is, in which the first switch $S_1$ is in switched ON) while the current flow path through the second switch $S_2$ is made non-conductive (that is, while the second switch $S_2$ is switched OFF); and during an "OFF" time interval $T_{OFF}$ in which the current flow path through the first switch $S_1$ is made non-conductive (that is, in which the first switch $S_1$ is in switched OFF), the current flow path through the second switch $S_2$ is made conductive (what is, the second switch $S_2$ is switched ON). During the OFF time interval $T_{OFF}$, the inductor current $i_L$ reaches the capacitive element C and the electric load $Z_L$.

In other words, in this configuration, energy is first stored in the inductive element L during the ON time interval and then transferred to the output load $Z_L$ during the OFF time interval.

As exemplified in FIG. 1A, the boost converter 10 is designed to deliver power to a given load $Z_L$ via an output current $i_O$, which is a function of the average value $<i_{S2}>$ of the current flowing in the second switch $S_2$.

When operated in CCM, for instance, the average inductor current $i_L$ is limited in slew rate by the available voltage during the duty-cycle change of the control signals $DRV_1$, $DRV_2$. In terms of control function (e.g., in the Laplace plane), this corresponds to the presence of a right-half-plane (RHP) zero, which introduces a 90° phase shift, thus limiting the maximum achievable control loop bandwidth.

As exemplified in FIG. 2, a control circuit 20 to control operation of the boost converter 10 (e.g., implemented in the controller 12) comprises a feedback branch fb coupled to the output node $V_{OUT}$ and to a reference node $V_{REF}$ configured to receive a reference voltage $V_{REF}$ (e.g., via an adder 21 configured to produce an error signal ε as a difference between the reference voltage $V_{REF}$ and the output voltage $V_{OUT}$). A control transfer function block 22 is coupled to the adder 21 to receive the error signal ε, wherein the control transfer function block 22 has a control transfer function H(S) and is configured to produce a control voltage $V_C$ based on the error signal ε. A PWM controller 24 is coupled to the control transfer function block 22, wherein the PWM controller 24 is configured to provide the control signals $DRV_1$, $DRV_2$ for the switches $S_1$, $S_2$ of the boost converter 10. An output gain block 26 is coupled to the PWM controller 24, wherein the output gain block 26 has a gain function $G_{od}(s)$. A filter block 27 (e.g., a passive RC filter comprising a resistive circuit element $R_{LPF}$ coupled to a capacitive circuit element $C_{LPF}$) is coupled to the control transfer function block 22 to receive the control voltage $V_C$ and to apply filtering thereto. The filter block 27 has a filter transfer function FF(s). A load transfer function block 28 is configured to produce the output voltage $V_{OUT}$ as a function of a product of the output current $i_o$ and the electric load Z, the load transfer function block 28 having a load transfer function $Z_0(s)$. A supply transfer function block 29 is configured to provide a supply transfer function $G_{oi}(s)$ between the output voltage $V_{OUT}$ and the supply voltage $V_{IN}$, the supply transfer function block 29 having a supply transfer function $G_{oi}(s)$. A second adder 30 is coupled to the output gain block 26, to the load transfer function block 28 and to the supply transfer function block 29, wherein the second adder 30 is configured to provide the output voltage $V_{OUT}$ as a superposition of the signals received from these blocks 28, 29. A third adder 31 is coupled to the filter block 27 and to the output node $V_{OUT}$ to provide the filtered control voltage $V_C$ thereto.

As a result of the presence of the filter circuit block 27, a transfer function $G_{do,FF}(s)$ between the PWM signal $V_{PWM}$ produced by the PWM circuit block 24 and the error signal ε can be expressed as:

$$G_{do,FF}(s) = G_{do}(0) \frac{\left(\frac{s^2}{\omega_{0z}^2} + \frac{s}{\omega_{0z}Q_z} + 1\right)}{\left(\frac{s^2}{\omega_0^2} + \frac{s}{\omega_0 Q} + 1\right)\left(1 + \frac{s}{\omega_{FF}}\right)}$$

where: $\omega_{0z}$ is the angular frequency of the zero doublet, e.g., generated by the combination of the path comprising the PWM circuit block 24, the output gain block 26, and the filter circuit block 27; for instance, the angular frequency can be real or complex conjugate depending on the gain and cut-off frequency of the filter circuit block; $Q_z$ is the quality factor of the zero doublet; $\omega_0$ is the angular frequency, e.g., of the pole doublet of the reactive elements L, C of the converter circuit 10; Q is the quality factor of the LC filter in the converter 10; and $\omega_{FF}$ is a cut-off frequency of filter circuit block 27.

As exemplified in FIG. 3, the elements of the control circuit 20 may be rearranged as an equivalent control circuit 20A, comprising a loop filter circuit block LF coupled to the first adder 31 to receive the error signal ε, wherein the loop filter circuit block LF comprises: a proportional-integral (briefly, PI) control circuit block 220 having a PI transfer function PI(s), the PI control circuit block 220 configured to provide the control voltage $V_C$. The filter block 27 coupled to the output of the PI transfer function PI(s) 220. The third adder 31 is coupled to the filter block 27, to the integrator 220 and to the first adder 21, wherein the third adder 31 is configured to add the filtered control voltage provided by the filter block 27 to the error signal ε.

As exemplified in FIG. 3, the load transfer function block 28, the supply transfer function block 29, the output gain block 26 and the second adder 30 are part of a power stage block PS interposed between the PWM circuit block 24 and the output node $V_{OUT}$.

Figure 4A:
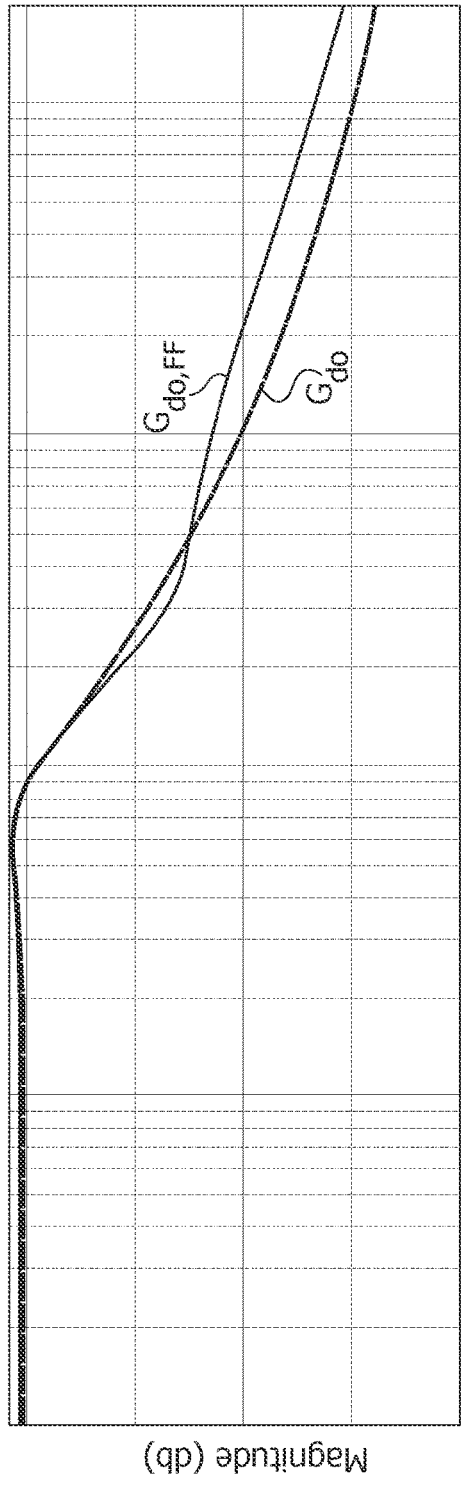
FIGS. 4A and 4B are Bode diagrams indicative of principles underlying one or more embodiments.

FIG. 4A is a Bode diagram showing the magnitude of transfer function $G_{do,FF}(S)$ as a function of frequency and of the transfer function $G_{do}(s)$ without the filter circuit block 27.

Figure 4B:
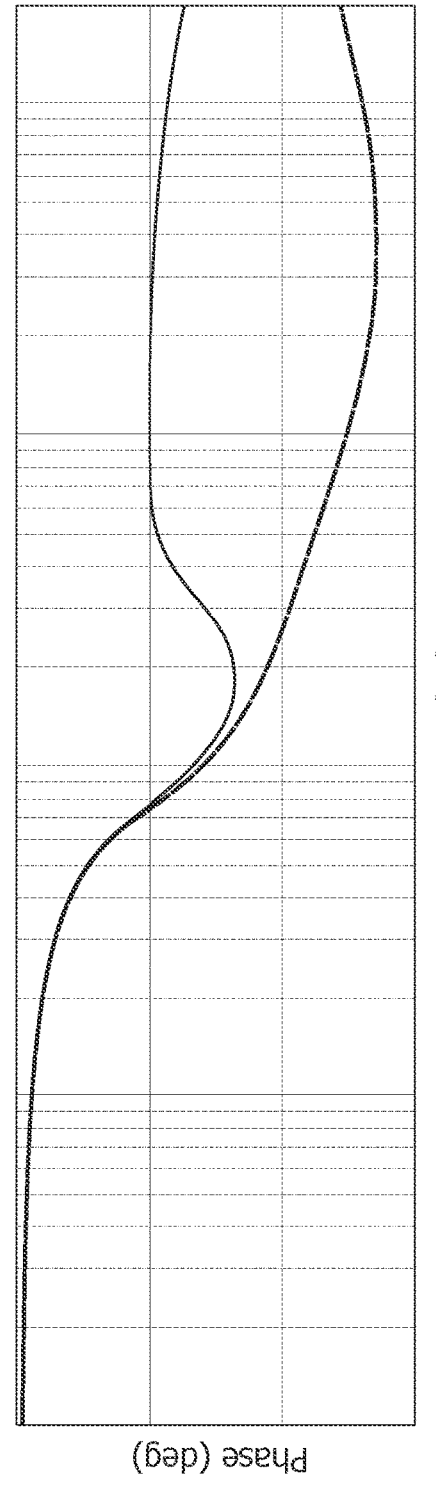

FIG. 4B is a Bode diagram showing the phase of the transfer function $G_{do,FF}(s)$ as a function of frequency and of the transfer function $G_{do}(s)$ without the filter circuit block 27.

As appreciable by a visual comparison of the magnitudes and phases of the transfer functions $G_{do,FF}(s)$, $G_{do}(s)$, the presence of the filter circuit block 27 facilitates compensating the right-hand-plane (RHZ) zero, as the transfer function $G_{do,FF}(s)$ has a trend that goes down with a reduced slope with respect to the transfer function without the filter circuit $G_{do}(s)$, as well as a phase boost of more than 90 degrees with respect to the transfer function without the filter circuit $G_{do}(s)$.

As a result of the presence of the filter circuit block 27, the output voltage $V_{OUT}$ can be expressed as:

$$V_{REF} - V_C \cdot K_{FF} = V_{OUT}$$

where: $K_{FF}$ is a gain introduced by the filter block 27 and $V_C$ is the control voltage.

Rearranging the terms in the above expression, the reference voltage $V_{REF}$ can be expressed as:

$$V_{REF} = V_{out} + \frac{D}{G_{pwm}} = V_{OUT} + V_c$$

where: D is the duty cycle, and $G_{PWM}$ is the gain of the PWM circuit block.

Therefore, the relationship between the output voltage $V_{OUT}$ and the reference voltage $V_{REF}$ may depend on the offset factor $D/G_{PWM}$.

For instance, the duty-cycle D can be estimated by the input/output voltage relationship, and may be expressed as:

$$D = 1 - \frac{V_{in}}{V_{ref}}$$

Figure 5:
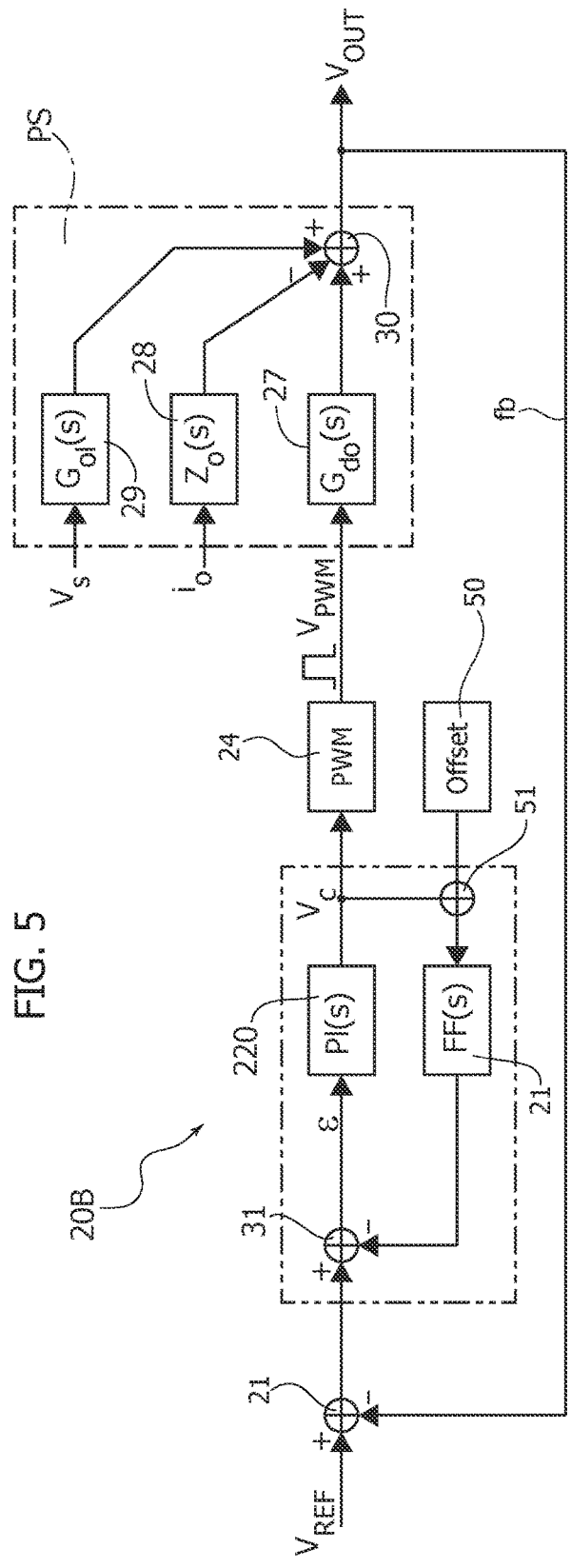
FIGS. 5 and 6 is a diagram exemplary of principles underlying one or more embodiments.

Such an offset factor $D/G_{PWM}$ may be further controlled using an arrangement as exemplified in FIG. 5.

As exemplified in FIG. 5, a further improved control circuit 20B comprises, with respect to the control circuit 20A exemplified in FIG. 3, an additional offset calibration block (Offset) 50 coupled to the filter circuit 27 in the loop filter block LF, e.g., via a fourth adder 51.

For instance, the arrangement 20B exemplified in FIG. 5 facilitates removing the DC offset $D/G_{PWM}$ without affecting the frequency response of the system.

Figure 6:
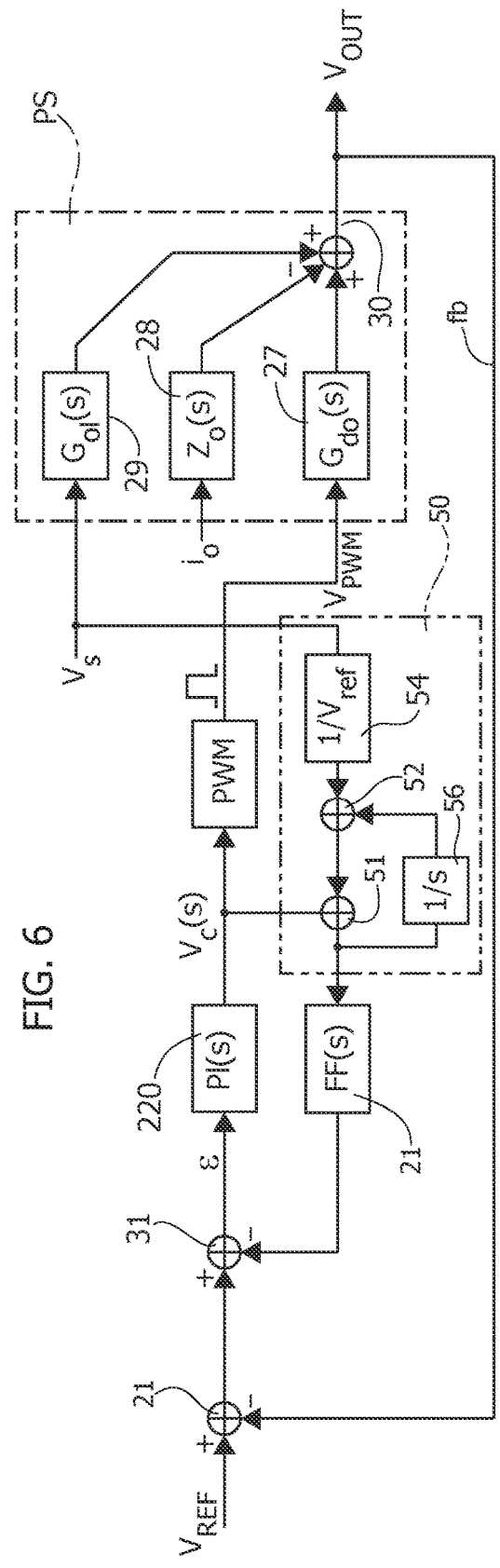

As exemplified in FIG. 6, the offset calibration block 50 comprises a multiplier stage 54 coupled to the supply node $V_{IN}$ to receive the supply voltage $V_{IN}$, wherein the first multiplier stage 54 is configured to provide a multiplication signal proportional to the supply voltage $V_{IN}$ times the inverse of the reference voltage $V_{REF}$, e.g., $V_{IN}/V_{REF}$. A pole circuit block 56 comprising a single pole (e.g., an integrator with transfer function 1/s) is coupled to the input of the filter block 27 and configured to provide a product of the difference between the control and the (coarse) estimation times the pole 1/s. A fifth adder 52 is coupled to the multiplier stage 54, to the pole circuit block 56 and is configured to perform a sum thereof and to provide it, e.g., via the fourth adder 51, to the filter circuit block 27, to perform a finer offset compensation.

As exemplified in FIG. 6, the offset calibration block 50 calculates the ratio between supply and reference voltage (which is a known voltage) and subtracts this value from the control voltage $V_C$.

As exemplified in FIG. 6, the presence of the pole circuit block 1/s facilitates countering additional offset due to the non-idealities of the converter (i.e., efficiency <1). Such an integral loop facilitates adjusting the level from which the ratio of the supply voltage to the reference voltage $V_{IN}/V_{REF}$ is subtracted. This may be expressed as, e.g.:

$$V_x - \frac{V_{in}}{V_{ref}} = 1 - \frac{V_{in}}{V_{ref}}\eta \rightarrow V_x = 1 + (1-\eta) \cdot \frac{V_{in}}{V_{ref}}$$

where η is the efficiency of the DC-DC converter 10.

For instance, in case the integral path is slow enough (e.g., reaching a condition that satisfies the expression $G_{int} << BW_{loop}$), the difference preserves the frequency information without affecting the overall response of the system.

Figure 7:
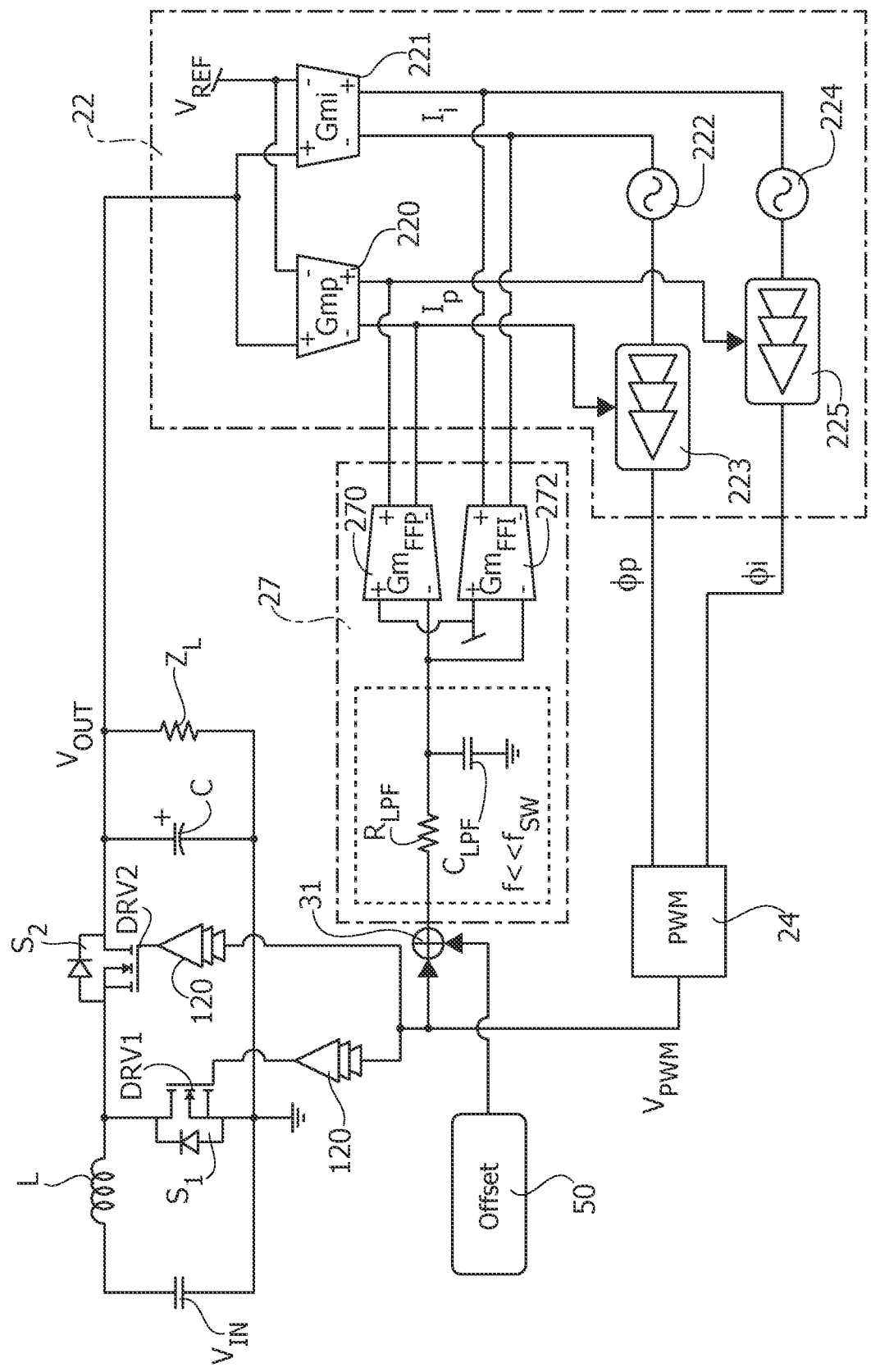
FIGS. 7 and 8 are diagrams exemplary of a time-based DC-DC converter circuit as per the present disclosure.

As exemplified in FIG. 7, a time-based implementation of the controller comprises: a time-based control function block 22, known per se, coupled to the output node $V_{OUT}$ and to the reference node $V_{REF}$. The time-based control function block 22 comprises a first transconductance amplifier 220 and a second transconductance amplifier 221 configured to perform a difference between the output voltage $V_{OUT}$ and the reference voltage $V_{REF}$, providing at least one error signal ε as current signal. The time-based control function block 22 further comprises current-controlled oscillators (CCOs) 222, 224 that provide integral control and current-controlled delay lines (CCDLs) 223, 225 that implement proportional control (in a manner per se known). A phase detector 24, coupled to the time-based control function block 22, is configured to perform a comparison of the phase of signals output by CCDLs 223, 225 to generate the duty-cycle signal $V_{PWM}$ and is further configured to drive (e.g., gate) drivers 120 to produce the control signals $DRV_1$, $DRV_2$ for the switching transistors $S_1$, $S_2$. The filter block 27 is coupled to the time-based controller and to the phase detector via the adder 31. Optionally, the offset calibration circuit block 50 is coupled to the filter circuit block 27 via the adder 31.

As exemplified in FIG. 7, the output voltage $V_{OUT}$ is fed to a first transconductance block 220, which receives also a reference voltage $V_{REF}$, and multiplies their difference by a transconductance $G_{mP}$, outputting a differential proportional current $I_p$ on two respective feedback and reference output branches, which are fed to a set of current-controlled-delay-lines (CCDLs) 223, 225, to generate the proportional gain. The output of the transconductance block 220 is differential on two branches. The two differential branches are then fed as control signals of two respective feedback current-controlled-delay-line 223 and reference current-controlled-delay-line 225 of the set of CCDLs 223, 225.

As exemplified in FIG. 7, the output voltage $V_{OUT}$ is fed to a second transconductance block 221, which also receives the reference voltage $V_{REF}$, and multiplies their difference by a transconductance $G_{mI}$, outputting a differential integral current Ii also on two respective feedback and reference output branches, which are fed to a set of Current-Controlled-Oscillators (CCOs) 222, 224, to generate the integral gain. The free running frequency of Current-Controlled-Oscillator (CCO) 222, 224 sets the switching frequency $f_{sw}$ of the driving signal, which frequency value preferably corresponds or depends on the frequency of the signal at the output of the Current-Controlled-Oscillators (CCOs) 222, 224, in particular corresponds to the switching frequency $f_{sw}$. Specifically, the switching frequency $f_{sw}$ corresponds to the frequency of the CCO 222 and 224 either during startup or steady state. The output of the transconductance block 221 is also differential on two branches. The signals on the two differential branches are then feed as control signals of two respective feedback and reference Current-Controlled-Oscillator 222 and 224 in the set of CCOs 222, 224 which outputs respectively a signal at a feedback frequency $\omega_F$ and a signal at a reference frequency $\omega_R$.

The output of the two current-controlled-oscillators 222 and 224, that is the signal at the feedback frequency $•_F$ and a signal at the reference frequency $\omega_R$, are fed respectively to the input of the respective Current-Controlled-Delay-Line 223 and 225.

The output of the current-controlled-delay-lines 223 and 225 is fed to a phase detector 24 which, through drivers 120, supplies the PWM driving signal $DRV_1$, $DRV_2$. The phase detector 24 is configured to generate a voltage waveform $V_{PWM}$ having a duty cycle that is proportional to a phase difference among the two signals provided by the CCDLs 223, 225.

For instance, the phase detector 24 may be embodied for instance simply by a SR (set-reset) latch with pulse generators at its inputs. The pulse generators generate narrow pulses on every positive edge transition of their inputs, resulting in SR flip-flop-like behavior for the phase detector 24. The duty-cycle of the pulse width modulated signal, $V_{PWM}$, is set at every positive edge of the reference, or control, phase, $\Phi_R$, and reset at every positive edge of the feedback phase, $\Phi_F$. Consequently, the duty-cycle of the signal, e.g., $V_{PWM}$ waveform, is proportional to a phase difference among two square-waves.

As exemplified in FIG. 7, the filter circuit block 27 comprises an RC network $R_{LPF}$, $C_{LPF}$ comprising a resistive element (e.g., a resistor) $R_{LPF}$ coupled to a capacitive element (e.g., a capacitor) $C_{LPF}$ referred to reference voltage such as ground. The RC network is configured to apply low-pass filtering to the voltage provided by the adder circuit 31, preferably at a frequency f much lower than a switching frequency $f_{sw}$ at which the (e.g., gate) drivers 120 apply switching to the switching transistors $S_1$, $S_2$. A pair of transconductance amplifiers 270, 272 are coupled to the RC network $R_{LPF}$, $C_{LPF}$ to receive the filtered voltage signal therefrom. The pair of transconductance amplifiers 270, 272 are also coupled to output nodes of the first 220 and second 221 transconductance amplifiers 220, 221 of the time-based control function block 22 provide a filtered current signal thereto.

As exemplified in FIG. 7, the filter circuit block 27 provides a filtered value of the PWM output (in particular, its duty-cycle) to the proportional-integrator function of the time-based control function block 22, injecting a steady state current on CCOs/CCDLs proportional to the average value of the duty-cycle square wave.

Figure 8:
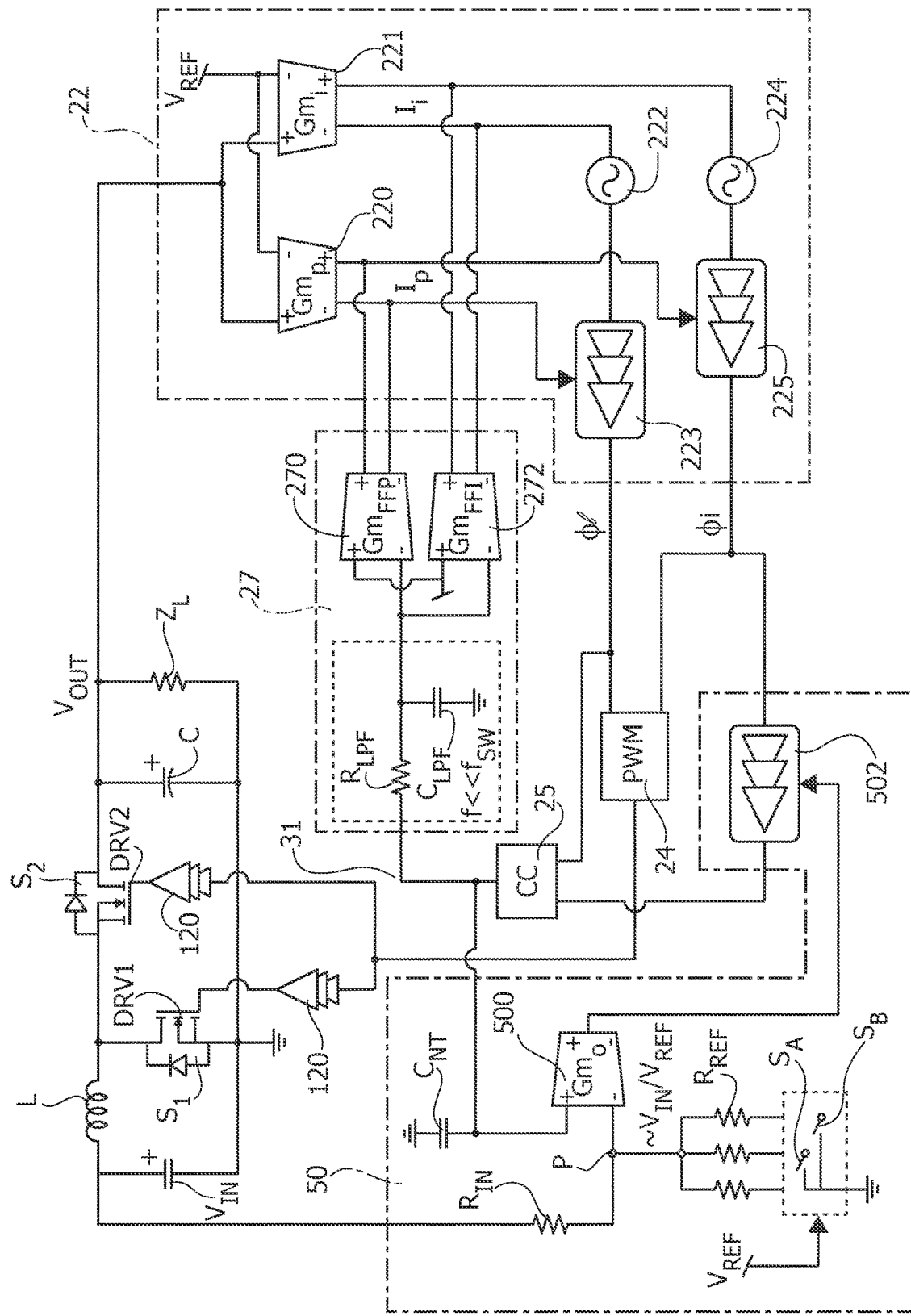

As exemplified in FIG. 8, in order to preserve the frequency response of the loop, the offset may be removed before the FF filter circuit block 27 using the offset calibration circuit 50, which may comprise a first resistive branch $R_{IN}$ coupled to the supply node $V_{IN}$ of the DC-DC converter 10, and a second resistive branch $R_{REF}$ coupled to the reference node $V_{REF}$ via switches $S_A$, $S_B$. For instance, a (e.g., programmable) reference voltage setpoint may be received at the reference node $V_{RFF}$ and a resistance $R_{REF}$ of the second resistive branch $R_{REF}$ may also be programmable and have a value set by a same control logic setting the reference voltage setpoint. It is noted that, while represented in FIG. 8 to encompass a number of three resistive elements, the second resistive branch $R_{REF}$ may notionally include any number of resistive elements, e.g. based on the number of programmable values of the reference voltage setpoint received at the reference node $V_{RFF}$. The first $R_{IN}$ and second $R_{REF}$ resistive branches are coupled at a common intermediate node P that provides a voltage indicative of a ratio of the supply voltage $V_{IN}$ and the reference voltage $V_{REF}$. A transconductance amplifier 500 has a first (e.g., inverting) input node coupled to the common intermediate node P to receive the voltage ratio, a second (e.g., non-inverting) input node coupled to a capacitive element referred to ground $C_{INT}$, and an output node configured to provide a current proportional to the voltage ratio at its first input node. The second input node of the transconductance amplifier 500 is coupled to the filter circuit block 27 and to a coupling circuit block (known per se) comprising a phase-frequency detector and a charge-pump (briefly, PFDCP). An offset calibration current controlled delay line (OC-CCDL) 502 is coupled to the output node of the transconductance amplifier 500.

Delay lines having a programmable delay as a function of a voltage or current signal are well known in the art. For example, in this context documents U.S. Pat. No. 5,650,739 A or 7,696,799 B2 may be cited (both documents incorporated herein by reference).

As exemplified in FIG. 8, the offset correction circuit 50 is configured to remove the steady state offset (e.g., $D/G_{PWM}$) by driving the OC-CCDL 502 so that its delay is proportional to the transconductance $G_{mD}$ of the transconductance amplifier 500 of the offset calibration circuit block 50 which produces a current proportional to the difference between the value on the capacitor $C_{int}$ and the converter's input voltage scaled by a factor proportional to the ratio $V_{in}/V_{ref}$. For instance, such a current is indicative of the ideal value of the duty-cycle, as it may be expressed as:

$$I_{OC}=Gm_D \cdot [V_{C_{int}}-V_{in}(R_{in}/R_{ref})]$$

where: $V_{C_{int}}$ is voltage across the capacitive element $C_{int}$ referred to ground while the duty cycle is $D=1-V_{IN}/V_{REF}$.

As exemplified in FIG. 8, tuning the value of transconductance $G_{mD}$ of the transconductance amplifier 500 and the gain of the OC-CCDL line 502, an output signal roc of the OC-CCDL line 502 may be indicative of the output of the CCDL 225 delayed by the estimated DC value of the duty-cycle. For instance, this may be expressed as:

$$\tau_{OC}=I_{OC} \cdot G_{OC_{CCDL}}=G_{OC_{CCDL}} \cdot Gm_D \cdot [V_{C_{int}}-V_{IN}(R_{IN}/R_{REF})]$$

As exemplified in FIG. 8, the output of the OC-CCDL 500 is provided to the coupling circuit (CC) block 25 that provides a signal indicative of a difference between the "real" duty-cycle, coming from the regulation loop, and the estimated one $\tau_{OC}$. For instance, the PFD of the coupling circuit 25 is configured to act on the charge pump of the coupling circuit 25 to drive it to injects current on the feedforward filter 27 and on the capacitive element $C_{int}$ of the offset calibration circuit block 50.

Figure 9:
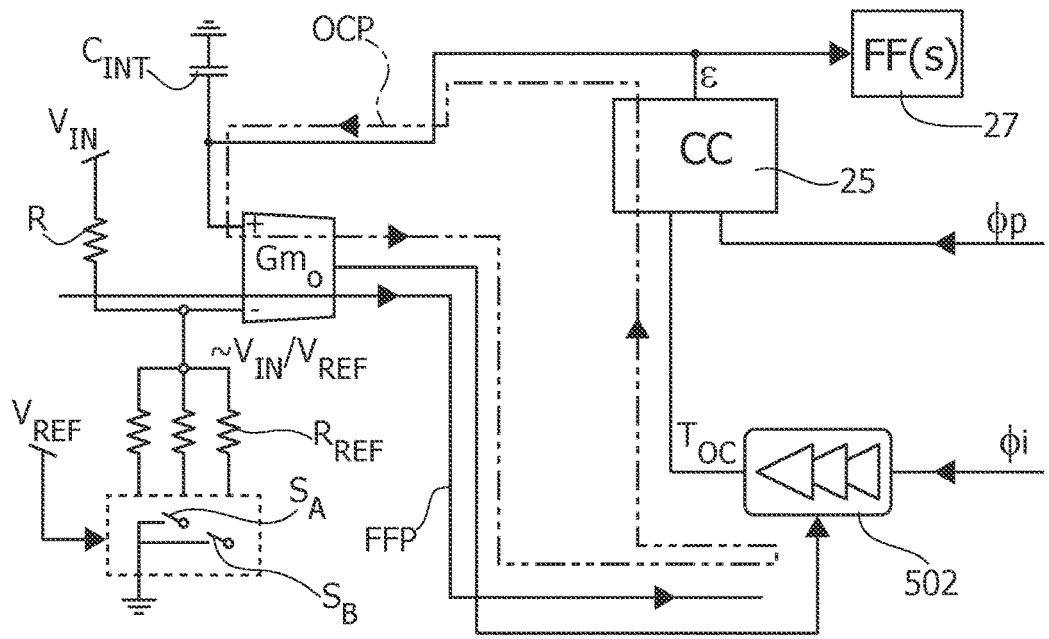
FIG. 9 is a diagram exemplary of principles underlying operating the time-based DC-DC converter circuit exemplified in FIGS. 7 and 8.
Figure 10:
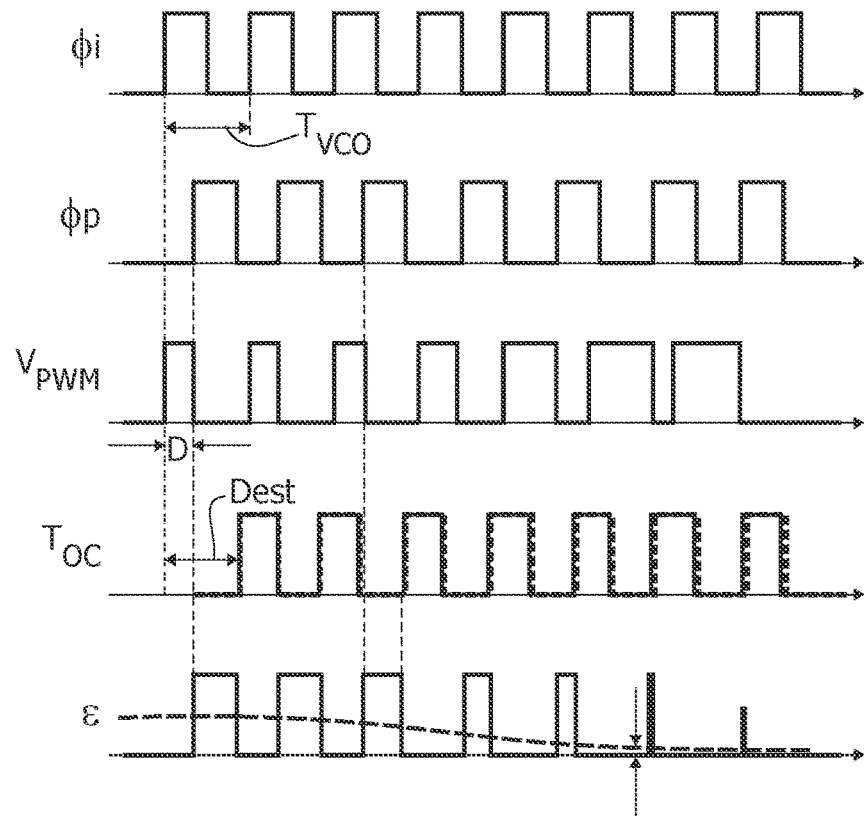
FIG. 10 is a diagram exemplary of an evolution over time of signals in one or more embodiments.

As shown in FIGS. 9 and 10, in response to a change of the effective duty-cycle (e.g., slowly changes cycle by cycle $BW \ll f_{SW}$), the estimated value $\tau_{OC}$ of the OC-delay-line 502 also changes by the intervention of the fast feedforward.

For instance, based on the difference between the effective duty-cycle D and the estimated one $\tau_{OC}$ (detected via the coupling circuitry 25), the offset may be removed.

For instance, any residual offset that may be present in the output voltage $V_{OUT}$ is slowly canceled out by the intervention of the loop OCP which adjust the positive input voltage of the transconductance amplifier 500 to provide the current that sets the OC-CCDL 502 to match the effective duty-cycle D.

A solution as exemplified in FIGS. 8 to 10 facilitates removing additional disturbances that may be otherwise injected in the loop.

FIG. 10 is a time diagram exemplary of the behavior over time of signals in one or more embodiments.

As exemplified in FIG. 10, the error s is reduced over time as a result of the loop OCP operation as discussed in the foregoing.

As exemplified in FIG. 11, in an alternative offset compensation circuit 50A, the OC-CCDL 502 may be replaced by an arrangement of transistors and current generators, as discussed in the following.

Figure 11:
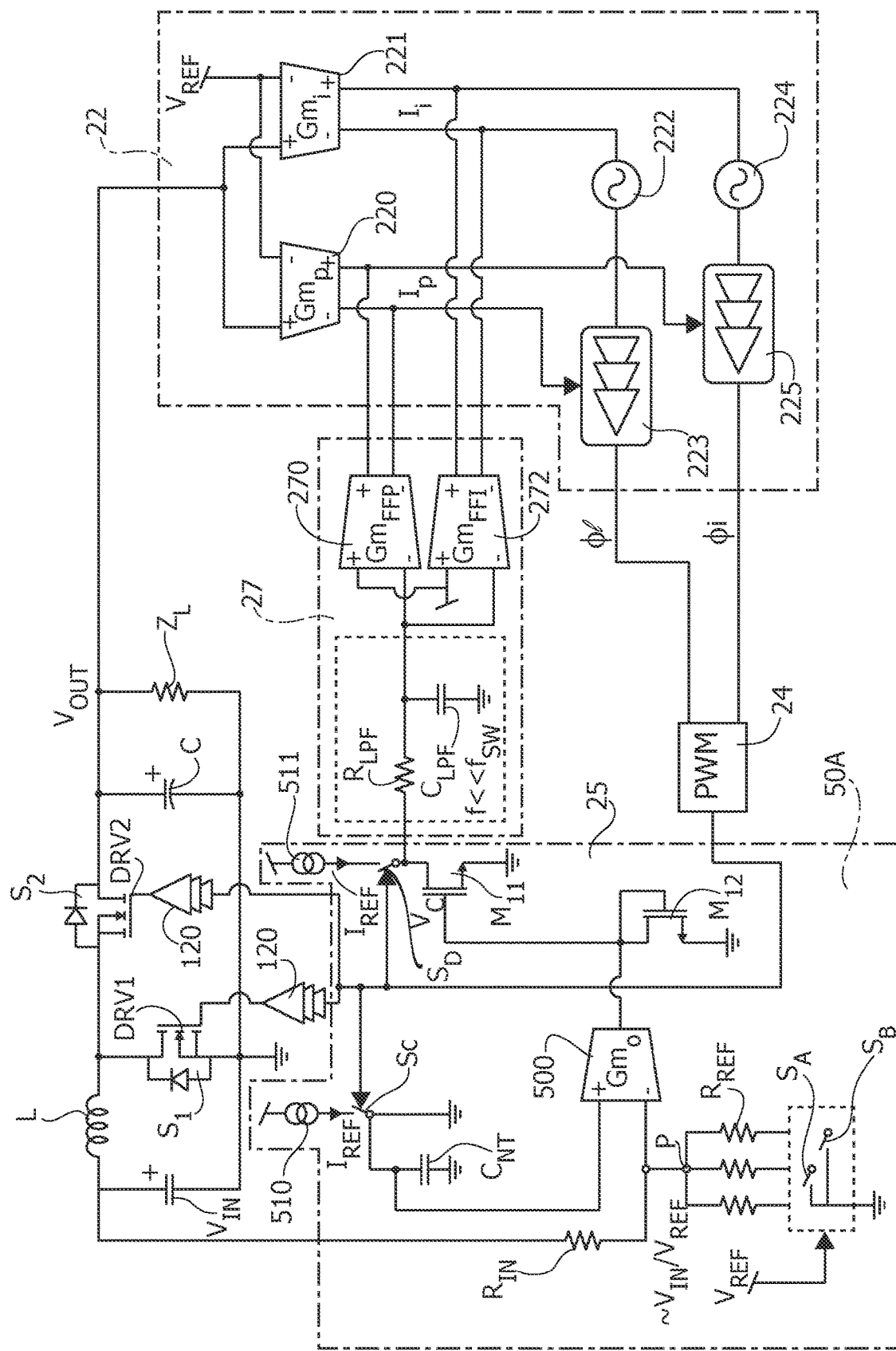
FIG. 11 is a diagram exemplary of a variant embodiment of a time-based DC-DC converter circuit as per the present disclosure.

As exemplified in FIG. 11, the variant offset correction circuit 50A comprises a first current generator 510 coupled to a first switch (e.g., a MOSFET) M10 via a first chopper switch Sc configured to be driven to be made conductive or non-conductive via the PWM signal $V_{PWM}$ provided by the phase detector 24. A second current generator 511 is coupled to a second switch (e.g., a MOSFET) M11 via a second chopper switch $S_D$ configured to be driven to be made conductive or non-conductive via the PWM signal $V_{PWM}$ provided by the phase detector 24, with a node intermediate the second switch M11 and the second chopper switch Sd being coupled to the filter circuit block 27. A third switch M12 is coupled to the output of the transconductance amplifier 500 and to the second switch M11.

As exemplified in FIG. 11, the arrangement of the switches Sc, Sd with respective current generators 510, 511 may be referred to as "current chopper", as the reference current $I_{ref}$ provided by these generators is "chopped" by the alternated opening and closing of the switches $S_C$, $S_D$, so that an average current $I_{ave}$ injected may be expressed as $$I_{ave}=D_{eff} \cdot I_{REF}$$

where: $D_{eff}$ is the effective duty-cycle of the PWM signal $V_{PWM}$ driving the DC-DC converter (e.g., taking into account also the circuit efficiency), and $I_{REF}$ is the reference current provided by the current generators 510, 511.

As appreciable to those of skill in the art, a chopper circuit is a kind of electronic switching circuit that converts a "fixed" DC input to a variable DC output voltage directly. In other words, a chopper is an electronic switch (e.g., Sc, Sd) that is used to interrupt one signal (e.g., the current $I_{REF}$ provided by a current generator 510, 511) under the control of another (e.g., the PWM signal $V_{PWM}$).

Figure 12:
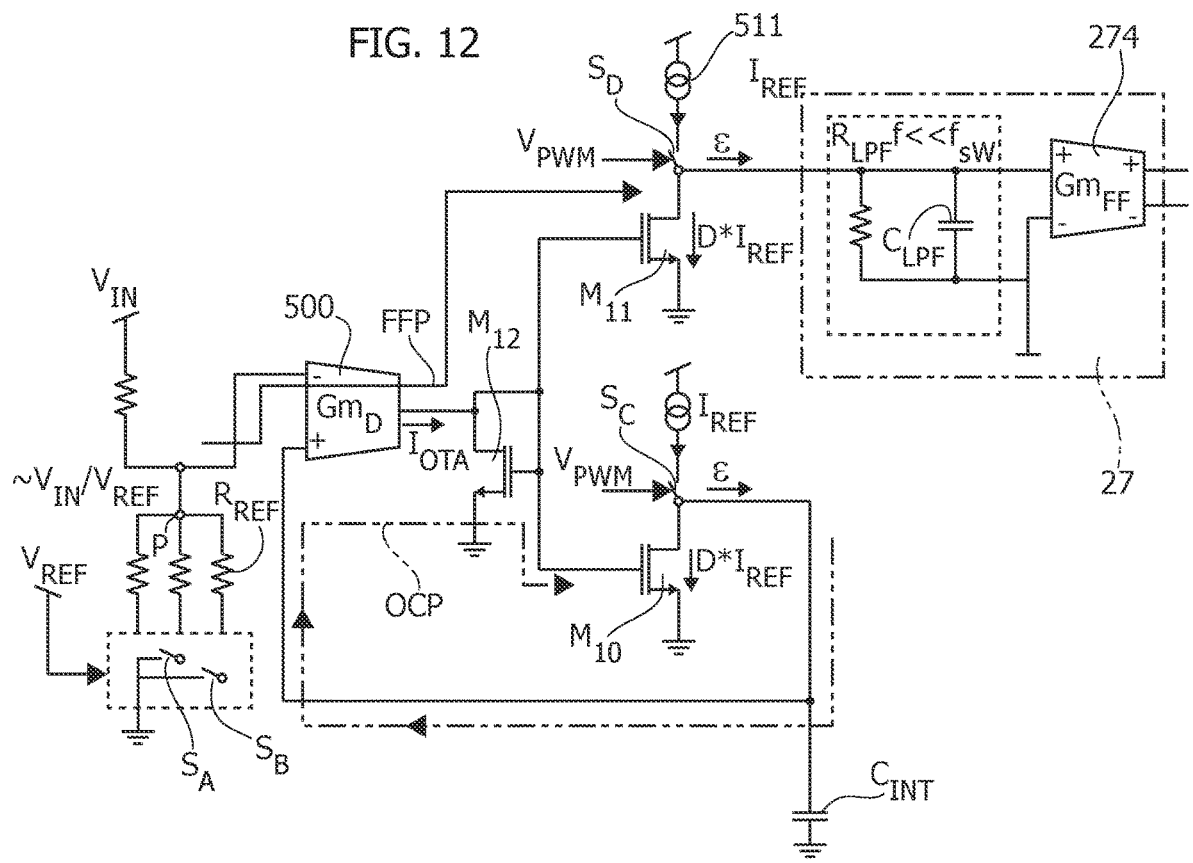
FIG. 12 is a diagram exemplary of principles underlying operating the time-based DC-DC converter circuit exemplified in FIG. 11.

As exemplified in FIGS. 11 and 12, a scaled input voltage proportional to a ratio of the supply voltage and the reference voltage (e.g., $V_{in}/V_{REF}$) drives the transconductance amplifier 500 whose output current is mirrored and subtracted via the current chopper 511, M11. For instance, the mirrored current is a continuous current that may be expressed as:

$$I_{M11}=Gm_D \cdot (V_{C_{int}}-V_{IN}(R_{IN}/R_{REF}))$$

As exemplified in FIGS. 11 and 12, as the estimated duty-cycle does not account for the converter efficiency, a residual average current $I_{ave}$ is injected on the RC network $R_{LPF}$, $C_{LPF}$ in the filter block 27, causing a residual offset on the regulated output voltage $V_{OUT}$.

As exemplified in FIGS. 11 and 12, the residual offset may be canceled thanks to the intervention of the integral loop OCP, adjusting the positive input of the transconductance amplifier 500 until the average current $I_{ave}$ injected on the capacitive element $C_{int}$ reaches zero.

For instance, in order to obtain an adequate cancellation of the residual offset, current choppers 511, Sd and 512, Sc may have a same gain.

For instance, during transients, when the effective duty-cycle slowly changes cycle by cycle, the estimated value of the mirrored current is (e.g., instantaneously) changed by the intervention of the fast feedforward FFP from the supply voltage $V_{in}$.

For instance, one or more embodiments facilitate preserving frequency information in the difference between the effective duty-cycle and the estimated one, while removing the offset.

Figure 13:
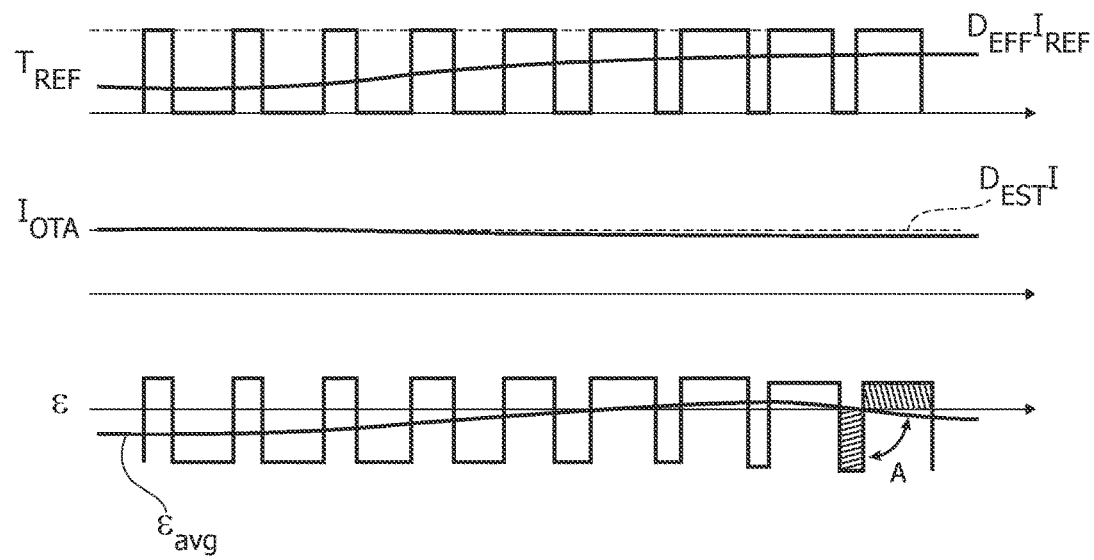
FIG. 13 is a diagram exemplary of an evolution over time of signals in one or more embodiments as per the present disclosure.

As exemplified in FIGS. 12 and 13, a product of the reference current provided by the generator $I_{REF}$ times the effective duty cycle $D_{eff}$ provided by the main loop produces a (e.g., square) waveform whose average value varies.

As exemplified in FIGS. 12 and 13, a product of an output current $I_{OTA}$ produced by the transconductance amplifier 500 and the estimated duty cycle $D_{EST}$ is indicative of the correction provided by the integral loop, correcting the offset.

As exemplified in FIGS. 12 and 13, the error signal F may be expressed as a difference of the above signals, e.g.:

$$\varepsilon=(D_{EFF}I-D_{EST}I)$$

For instance, in a static condition, the error signal $\varepsilon=(D_{EFF}I-D_{EST}I)$ is a square wave with average value zero.

As exemplified herein, a boost DC-DC converter apparatus operating in a PWM mode comprises a DC-DC boost converter architecture comprising a boost inductor L arranged in series with a supply voltage generator $V_{IN}$ providing a supply voltage to said boost inductor and an output capacitor C coupled to an output node $V_{OUT}$ in parallel with an output load $Z_L$, a switching network $S_1$, $S_2$ configured to selectively couple the output of the boost inductor to the output node under the control of a PWM driving signal $V_{PWM}$. The boost DC-DC converter apparatus comprises: a control loop 22, 24, 26 coupled to the voltage output and providing said PWM driving signal at its output, said control loop configured to produce an error signal ε as a function of a difference between an output voltage and a reference voltage $V_{REF}$ and configured to provide said PWM driving signal based on said error signal; and a low pass filter circuit block 27 coupled to the control loop to receive the PWM signal therefrom, the low pass filter circuit block 27 configured to apply low-pass filtering to the PWM signal, providing at least one filtered signal to the control loop. The control loop comprises at least one adder node 51, 31 configured to receive the at least one filtered signal from the low pass filter circuit block and to add the filtered signal to the error signal, providing said PWM driving signal as a function of a sum of the filtered signal and of the error signal.

As exemplified herein, the control loop comprises a time-based control loop, comprising an integral control branch 221, 222, 224 and a proportional branch 220, 223, 225. The integral control branch 221, 222, 224 is configured to convert said error signal into an integral control current signal Ii, which is used to obtain a control signal of at least one current controlled oscillator 222, 224, supplying a first signal on which the switching frequency $f_{sw}$ of the PWM driving signal depends, in particular corresponds to, operating with a first phase $\Phi_R$ depending on said integral control current signal. The proportional branch 220, 223, 225 is configured to convert said error signal into a proportional control current signal $I_p$ which is used to obtain a control signal of at least one delay line 223, 225, receiving at its input said first signal operating with a first phase, configured to sum in said first signal $\Phi_R$, $\Phi_F$ a second phase depending on said proportional control current signal to obtain at least one time signal $\Phi_R$, $\Phi_F$. The at least one time signal is supplied to a phase detector 24 configured to output a switching voltage $V_{PWM}$ which duty cycle D is a function of the phase of the at least one time signal, in its turn supplied to a driver circuit to control the generation of the driving PWM signal driving the switching network of said DC-DC boost converter architecture.

As exemplified herein, the low pass filter circuit block 27 comprises: an RC network $R_{LPF}$, $C_{LPF}$ configured to apply low-pass filtering to the PWM signal; and at least one transconductance amplifier 270, 272 configured to apply transconductance amplification to the filtered PWM signal, providing at least one filtered current signal to the time-based control loop. The at least one adder node of the control loop is configured to add the at least one filtered current signal to the integral control current signal and to the proportional control current signal. The sum of the at least one filtered current signal and of the proportional control current signal is used to obtain the control signal of at least one delay line 223, 225. The sum of the at least one filtered current signal of the integral control current signal is used to obtain a control signal of at least one current controlled oscillator 222, 224.

As exemplified herein, the boost DC-DC converter comprises an offset compensation circuit block 50; 50A coupled to the low pass filter circuit block, the offset compensation circuit block configured to apply offset compensation processing to the PWM signal, providing an offset compensated PWM signal to the low pass filter circuit block.

As exemplified herein, the offset compensation circuit block comprises: a first resistive branch $R_{IN}$ coupled to the supply voltage; and a second resistive branch $R_{REF}$ coupled to a setpoint reference node via a set of switches $S_A$, $S_B$, the setpoint reference node configured to receive a setpoint reference voltage $V_{REF}$. The first and second resistive branches are coupled at a common intermediate node P providing a voltage indicative of a voltage ratio of the supply voltage and the reference voltage. A transconductance amplifier 500 has a first input node coupled to the common intermediate node to receive the voltage ratio, a second input node coupled to a capacitive element $C_{INT}$ referred to ground, and an output node configured to provide a current proportional to the voltage ratio at its first input node, wherein the second input node of the transconductance amplifier is coupled to the filter circuit block and to a coupling circuit block comprising a phase-frequency detector and a charge-pump, PFDCP, circuit block 25. An offset calibration current controlled delay line, OC-CCDL, 502 is coupled to the output node of the transconductance amplifier.

As exemplified herein, the offset compensation circuit block 50A comprises: a first current generator 510 coupled to a first switch M10 via a first chopper switch Sc configured to be driven to be made conductive or non-conductive via the PWM signal provided by the phase detector; and a second current generator 511 coupled to a second switch M11 via a second chopper switch $S_D$, the second chopper switch $S_D$ configured to be driven to be made conductive or non-conductive via the PWM signal provided by the phase detector (24). A third switch M12 is coupled to the output of the transconductance amplifier and to the second switch. The first 510 and the second 511 current generators are configured to provide a reference current $I_{REF}$, with the second switch and the second chopper switch having a common intermediate node coupled to the filter circuit block.

As exemplified herein: the low pass filter circuit block has a cut-off angular frequency $\omega_{FF}$, and a transfer function $G_{do,FF}(S)$ between said PWM driving signal and the error signal produced as a function of a difference between the output voltage $V_{OUT}$ and the reference voltage $V_{REF}$ is expressed as:

$$G_{do,FF}(s) = G_{do}(0) \frac{\left(\frac{s^2}{\omega_{0z}^2} + \frac{s}{\omega_{0z}Q_z} + 1\right)}{\left(\frac{s^2}{\omega_0^2} + \frac{s}{\omega_0 Q} + 1\right)\left(1 + \frac{s}{\omega_{FF}}\right)}$$

where: $\omega_{0z}$ is an angular frequency, of the zero doublet generated by the combination of the two path Gdo(s) and FF(s); $Q_z$ is the quality factor, of the zero doublet; $\omega_0$ is an angular frequency of the pole doublet of the LC filter of the boost DC-DC converter apparatus; Q is a quality factor of the pole doublet of the LC filter of the boost DC-DC converter apparatus; and $\omega_{FF}$ is the angular frequency of the filter circuit block (27).

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

The claims are an integral part of the technical teaching provided herein with reference to the embodiments.

Without prejudice to the underlying principles, the details and embodiments may vary, even significantly, with respect to what has been described by way of example only, without departing from the extent of protection. The extent of protection is defined by the annexed claims.

The invention claimed is:

1. A boost DC-DC converter apparatus, comprising:
a boost inductor arranged in series with a supply voltage generator providing a supply voltage to said boost inductor;
an output capacitor coupled to an output node in parallel with an output load;
a switching network configured to selectively couple an output of the boost inductor to the output node under the control of a PWM driving signal;
a control loop having an input coupled to receive the output voltage and an output providing said PWM driving signal, said control loop configured to produce an error signal as a function of a difference between the output voltage and a reference voltage and generate said PWM driving signal based on said error signal;
a low pass filter circuit coupled to the control loop and configured to receive the PWM driving signal, the low pass filter circuit configured to apply low-pass filtering to the PWM driving signal and generate at least one filtered signal;
wherein the control loop comprises at least one adder node configured to receive the at least one filtered signal from the low pass filter circuit and to add the at least one filtered signal to the error signal;
wherein said PWM driving signal is generated as a function of a signal output from said at least one adder node.

2. The boost DC-DC converter apparatus of claim 1, wherein the control loop is a time-based control loop comprising:
an integral control branch configured to convert said error signal into an integral control current signal from which a control signal is generated to control at least one current controlled oscillator to supply a first signal on which a switching frequency of the PWM driving signal depends, said first signal having a first phase depending on said integral control current signal; and
a proportional branch configured to convert said error signal into a proportional control current signal from which a control signal is generated to control at least one delay line configured to delay said first signal by a second phase depending on said proportional control current signal to generate at least one time signal;
a phase detector configured to receive said at least one time signal and output a switching voltage having a duty cycle that is a function of a phase of the at least one time signal; and
a driver circuit configured to receive the switching voltage and control generation of the PWM driving signal.

3. The boost DC-DC converter apparatus of claim 2, wherein the low pass filter circuit comprises:
an RC network configured to apply low-pass filtering to the PWM driving signal; and
at least one transconductance amplifier configured to apply transconductance amplification to the low-pass filtered PWM driving signal to generate at least one filtered current signal to the time-based control loop;
wherein the at least one adder node of the time-based control loop is configured to add the at least one filtered current signal to the integral control current signal and to the proportional control current signal;
wherein a sum of the at least one filtered current signal and the proportional control current signal is used to obtain the control signal of the at least one delay line; and
wherein a sum of the at least one filtered current signal of the integral control current signal is used to obtain the control signal of the at least one current controlled oscillator.

4. The boost DC-DC converter apparatus of claim 1, further comprising an offset compensation circuit coupled to the low pass filter circuit, the offset compensation circuit configured to apply offset compensation processing to the PWM signal, providing an offset compensated PWM signal to the low pass filter circuit.

5. The boost DC-DC converter apparatus of claim 4, wherein the offset compensation circuit comprises:
a first resistive branch coupled to the supply voltage;
a second resistive branch coupled to a setpoint reference node via a set of switches, the setpoint reference node configured to receive a setpoint reference voltage;
where the first and second resistive branches are coupled at a common intermediate node providing a voltage indicative of a voltage ratio of the supply voltage and the setpoint reference voltage;
a transconductance amplifier having a first input node coupled to the common intermediate node to receive the voltage ratio, a second input node coupled to a capacitive element referred to ground, and an output node configured to provide a current proportional to the voltage ratio at the first input node, wherein the second input node of the transconductance amplifier is coupled to the filter circuit and to a coupling circuit comprising a phase-frequency detector and a charge-pump circuit; and
an offset calibration current controlled delay line coupled to the output node of the transconductance amplifier.

6. The boost DC-DC converter apparatus of claim 4, wherein the offset compensation circuit comprises:
a first current generator coupled to a first switch via a first chopper switch that is driven to be made conductive or non-conductive via the PWM signal provided by the phase detector;
a second current generator coupled to a second switch via a second chopper switch that is driven to be made conductive or non-conductive via the PWM signal provided by the phase detector;
a third switch coupled to the output of the transconductance amplifier and to the second switch;
wherein the first and the second current generators are configured to provide a reference current; and
wherein the second switch and the second chopper switch have a common intermediate node coupled to the filter circuit.

7. The boost DC-DC converter apparatus of claim 1, wherein:
the low pass filter circuit has a cut-off angular frequency $\omega_{FF}$; and
a transfer function $G_{do,FF}(S)$ between said PWM driving signal and the error signal produced as a function of a difference between the output voltage and the reference voltage is expressed as:

$$G_{do,FF}(s) = G_{do}(0) \frac{\left(\frac{s^2}{\omega_{0z}^2} + \frac{s}{\omega_{0z}Q_z} + 1\right)}{\left(\frac{s^2}{\omega_0^2} + \frac{s}{\omega_0 Q} + 1\right)\left(1 + \frac{s}{\omega_{FF}}\right)}$$

where: $\omega_{0z}$ is an angular frequency of the zero doublet generated by the combination of the two path Gdo(s) and FF(s); $Q_z$ is the quality factor of the zero doublet; $\omega_0$ is an angular frequency of the pole doublet of the LC filter of the boost DC-DC converter apparatus; Q is a quality factor of the pole doublet of the LC filter of the boost DC-DC converter apparatus; and $\omega_{FF}$ is the angular frequency of the filter circuit.

8. A boost DC-DC converter apparatus, comprising:

a boost inductor arranged in series with a supply voltage generator providing a supply voltage to said boost inductor;

an output capacitor coupled to an output node in parallel with an output load;

a switching network configured to selectively couple the output of the boost inductor to the output node under the control of a PWM driving signal;

a control loop having an input coupled to the voltage output and an output providing said PWM driving signal;

said control loop comprising:
  a first adder circuit configured to generate an error signal as a function of a difference between an output voltage and a reference voltage;
  a second adder circuit configured to generate a first signal as a function of a sum of the error signal and a second signal;
  a proportional integral circuit having an input configured to receive the first signal and an output configured to generate a PWM control voltage signal;
  a low-pass filter circuit configured to filter the PWM control voltage signal and generate the second signal; and
  a PWM circuit having input configured to receive the PWM control voltage signal and an output configured to the generate said PWM driving signal.

9. The boost DC-DC converter apparatus of claim 8, wherein the control loop further comprises a third adder circuit configured to add an offset to the PWM control voltage signal for input to the low-pass filter circuit.

10. The boost DC-DC converter apparatus of claim 9, further comprising an offset compensation circuit configured to generate said offset, the offset compensation circuit comprising:

a first resistive branch coupled to a supply voltage;

a second resistive branch coupled to a setpoint reference node via a set of switches, the setpoint reference node configured to receive a setpoint reference voltage;

where the first and second resistive branches are coupled at a common intermediate node providing a voltage indicative of a voltage ratio of the supply voltage and the setpoint reference voltage;

a transconductance amplifier having a first input node coupled to the common intermediate node to receive the voltage ratio, a second input node coupled to a capacitive element referred to ground, and an output node configured to provide a current proportional to the voltage ratio at its first input node, wherein the second input node of the transconductance amplifier is coupled to the filter circuit and to a coupling circuit comprising a phase-frequency detector and a charge-pump circuit; and an offset calibration current controlled delay line coupled to the output node of the transconductance amplifier.

11. The boost DC-DC converter apparatus of claim 9, further comprising an offset compensation circuit configured to generate said offset, the offset compensation circuit comprising:

a first current generator coupled to a first switch via a first chopper switch configured to be driven to be made conductive or non-conductive via the PWM driving signal;

a second current generator coupled to a second switch via a second chopper switch configured to be driven to be made conductive or non-conductive via the PWM driving signal;

a third switch coupled to the output of the transconductance amplifier and to the second switch;

wherein the first and the second current generators are configured to provide a reference current; and wherein the second switch and the second chopper switch have a common intermediate node coupled to the low-pass filter circuit.

12. The boost DC-DC converter apparatus of claim 8, wherein the control loop further comprises:

a third adder circuit configured to add a third signal to the PWM control voltage signal for input to the low-pass filter circuit;

a fourth adder circuit configured to add a fourth signal to a fifth signal to generate said third signal;

a pole blocking circuit having input coupled to the output of the third adder circuit and configured to generate the fourth signal; and a multiplier circuit configured to scale a supply voltage to generate said fifth signal.

13. The boost DC-DC converter apparatus of claim 12, wherein the pole blocking circuit is an integrator circuit.

14. The boost DC-DC converter apparatus of claim 8, wherein the proportional integral circuit comprises:

an integral control branch configured to convert said first signal into an integral control current signal from which a control signal is generated to control at least one current controlled oscillator to supply a first oscillation signal, on which a switching frequency of the PWM driving signal depends, said first oscillation signal having a first phase depending on said integral control current signal; and a proportional branch configured to convert said first signal into a proportional control current signal from which a control signal is generated to control at least one delay line configured to delay said first oscillation signal by a second phase depending on said proportional control current signal to generate at least one time signal.

15. The boost DC-DC converter apparatus of claim 14, wherein the PWM circuit comprises:

a phase detector configured to receive said at least one time signal and output a switching voltage having a duty cycle that is a function of a phase of the at least one time signal; and a driver circuit configured to receive the switching voltage and control generation of the PWM driving signal.

16. The boost DC-DC converter apparatus of claim 8, wherein the low-pass filter circuit comprises:

an RC network configured to apply low-pass filtering to the PWM control voltage signal; and at least one transconductance amplifier configured to apply transconductance amplification to the low-pass filtered PWM control voltage signal to generate the second signal.

\* \* \* \* \*